United States Patent
Jung et al.

(10) Patent No.: US 11,102,751 B2
(45) Date of Patent: Aug. 24, 2021

(54) DETERMINING PAGING OCCASION RESOURCES

(71) Applicant: Lenovo (Singapore) PTE. LTD., New Tech Park (SG)

(72) Inventors: Hyejung Jung, Palatine, IL (US); Vijay Nangia, Woodridge, IL (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 45 days.

(21) Appl. No.: 16/150,017

(22) Filed: Oct. 2, 2018

(65) Prior Publication Data

US 2019/0104498 A1 Apr. 4, 2019

Related U.S. Application Data

(60) Provisional application No. 62/567,125, filed on Oct. 2, 2017.

(51) Int. Cl.
*H04W 68/00* (2009.01)
*H04L 5/00* (2006.01)
*H04W 72/04* (2009.01)

(52) U.S. Cl.
CPC ......... *H04W 68/005* (2013.01); *H04L 5/0053* (2013.01); *H04L 5/0091* (2013.01); *H04W 72/042* (2013.01)

(58) Field of Classification Search
None
See application file for complete search history.

(56) References Cited

U.S. PATENT DOCUMENTS

| | | | | |
|---|---|---|---|---|
| 2015/0230210 A1* | 8/2015 | Lee | ....... | H04L 5/0048 370/329 |
| 2019/0052434 A1* | 2/2019 | Zhou | ....... | H04L 5/0091 |
| 2019/0215815 A1* | 7/2019 | Blankenship | ....... | H04L 5/0053 |
| 2020/0119874 A1* | 4/2020 | Liu | ....... | H04L 5/0051 |

OTHER PUBLICATIONS

Nokia Nokia Shanghai Bell, "Paging in NR", 3GPP TSG-RAN1 NR AH#3 R1-1716527, Oct. 18-21, 2017, pp. 1-8.
PCT/IB2018/001644, "International Preliminary Report on Patentability", dated Jun. 30, 2020, pp. 1-12.
Huawei, Hisilicon, "Finalization of NR Paging", 3GPP TSG RAN WG1 Meeting NR#3 R1-1715389, Sep. 18-21, 2017, pp. 1-2.
Huawei, Hisilicon, "Multi-beam operation for PDCCH", 3GPP TSG RAN WG1 NR Ad-Hoc Meeting R1-1710012, Jun. 27-30, 2017, pp. 1-5.
Ericsson, "Paging design", 3GPP TSG RAN WG1 Meeting #90bis R1-1718714, Oct. 9-13, 2017, pp. 1-6.
Huawei, "Summary on remaining details on Paging", 3GPP TSG RAN WG1 Meeting #NR-AH3 R1-1716895, Sep. 18-21, 2017, pp. 1-13.

* cited by examiner

*Primary Examiner* — Ajit Patel
*Assistant Examiner* — Pamit Kaur
(74) *Attorney, Agent, or Firm* — Kunzler Bean & Adamson

(57) ABSTRACT

Apparatuses, methods, and systems are disclosed for determining paging occasion resources. One method includes determining a first control resource set for receiving system information. The method includes determining to use a second control resource set to determine a paging occasion. The first control resource set is the same as the second control resource set in response to not receiving information indicating to use a different control resource set than the first control resource set.

20 Claims, 6 Drawing Sheets

DETERMINING PAGING OCCASION RESOURCES

CROSS-REFERENCE TO RELATED APPLICATIONS

This application claims priority to U.S. Patent Application Ser. No. 62/567,125 entitled "PAGING RESOURCE CONFIGURATIONS FOR MULTI-BEAM OPERATIONS" and filed on Oct. 2, 2017 for Hyejung Jung, which is incorporated herein by reference in its entirety.

FIELD

The subject matter disclosed herein relates generally to wireless communications and more particularly relates determining paging occasion resources.

BACKGROUND

The following abbreviations are herewith defined, at least some of which are referred to within the following description: Third Generation Partnership Project ("3GPP"), 5$^{th}$ Generation ("5G"), Positive-Acknowledgment ("ACK"), Angle of Arrival ("AoA"), Angle of Departure ("AoD"), Additional MPR ("A-MPR"), Access Point ("AP"), Binary Phase Shift Keying ("BPSK"), Buffer Status Report ("BSR"), Carrier Aggregation ("CA"), Clear Channel Assessment ("CCA"), Cyclic Delay Diversity ("CDD"), Code Division Multiple Access ("CDMA"), Control Element ("CE"), Closed-Loop ("CL"), Commercial Mobile Alert System ("CMAS"), Coordinated Multipoint ("CoMP"), Cyclic Prefix ("CP"), Cyclical Redundancy Check ("CRC"), Channel State Information ("CSI"), Common Search Space ("CSS"), Control Resource Set ("CORESET"), Discrete Fourier Transform Spread ("DFTS"), Downlink Control Information ("DCI"), Downlink ("DL"), Demodulation Reference Signal ("DMRS"), Discontinuous Reception ("DRX"), Downlink Pilot Time Slot ("DwPTS"), Extended Access Barring ("EAB"), Enhanced Clear Channel Assessment ("eCCA"), Enhanced Mobile Broadband ("eMBB"), Evolved Node B ("eNB"), Effective Isotropic Radiated Power ("EIRP"), Evolved Packet Core ("EPC"), European Telecommunications Standards Institute ("ETSI"), Earthquake and Tsunami Warning System ("ETWS"), Frame Based Equipment ("FBE"), Frequency Division Duplex ("FDD"), Frequency Division Multiple Access ("FDMA"), Frequency Division Orthogonal Cover Code ("FD-OCC"), General Packet Radio Services ("GPRS"), Guard Period ("GP"), Global System for Mobile Communications ("GSM"), Hybrid Automatic Repeat Request ("HARQ"), Identity or Identifier ("ID"), International Mobile Telecommunications ("IMT"), Internet-of-Things ("IoT"), Layer 2 ("L2"), Licensed Assisted Access ("LAA"), Load Based Equipment ("LBE"), Listen-Before-Talk ("LBT"), Logical Channel ("LCH"), Logical Channel Prioritization ("LCP"), Long Term Evolution ("LTE"), Multiple Access ("MA"), Medium Access Control ("MAC"), Multimedia Broadcast Multicast Services ("MBMS"), Modulation Coding Scheme ("MCS"), Machine Type Communication ("MTC"), massive MTC ("mMTC"), Master Information Block ("MIB"), Multiple Input Multiple Output ("MIMO"), Maximum Power Reduction ("MPR"), Multi User Shared Access ("MUSA"), Narrowband ("NB"), Negative-Acknowledgment ("NACK") or ("NAK"), Next Generation Node B ("gNB"), Non-Orthogonal Multiple Access ("NOMA"), New Radio ("NR"), Orthogonal Frequency Division Multiplexing ("OFDM"), Open-Loop ("OL"), Power Angular Spectrum ("PAS"), Power Control ("PC"), Primary Cell ("PCell"), Physical Broadcast Channel ("PBCH"), Physical Downlink Control Channel ("PDCCH"), Packet Data Convergence Protocol ("PDCP"), Physical Downlink Shared Channel ("PDSCH"), Pattern Division Multiple Access ("PDMA"), Paging Frame ("PF"), Physical Hybrid ARQ Indicator Channel ("PHICH"), Power Headroom ("PH"), Power Headroom Report ("PHR"), Physical Layer ("PHY"), Paging Occasion ("PO"), Physical Random Access Channel ("PRACH"), Physical Resource Block ("PRB"), Paging RNTI ("P-RNTI"), Primary SS ("PSS"), Physical Uplink Control Channel ("PUCCH"), Physical Uplink Shared Channel ("PUSCH"), Quasi Co-Located ("QCL"), Quality of Service ("QoS"), Quadrature Phase Shift Keying ("QPSK"), Radio Access Network ("RAN"), Radio Access Technology ("RAT"), Radio Resource Control ("RRC"), Random Access Procedure ("RACH"), Random Access Response ("RAR"), Resource Element ("RE"), Radio Link Control ("RLC"), Radio Network Temporary Identifier ("RNTI"), Reference Signal ("RS"), Remaining Minimum System Information ("RMSI"), Resource Spread Multiple Access ("RSMA"), Reference Signal Received Power ("RSRP"), Round Trip Time ("RTT"), Receive ("RX"), Sparse Code Multiple Access ("SCMA"), Scheduling Request ("SR"), Sounding Reference Signal ("SRS"), Single Carrier Frequency Division Multiple Access ("SC-FDMA"), Secondary Cell ("SCell"), Shared Channel ("SCH"), Sub-carrier Spacing ("SCS"), Service Data Unit ("SDU"), System Information ("SI"), Signal-to-Interference-Plus-Noise Ratio ("SINK"), System Information Block ("SIB"), Synchronization Signal ("SS"), Secondary SS ("SSS"), System Architecture Evolution Temporary Mobile Subscriber Identity ("S-TMSI"), Transport Block ("TB"), Transport Block Size ("TBS"), Time-Division Duplex ("TDD"), Time Division Multiplex ("TDM"), Time Division Orthogonal Cover Code ("TD-OCC"), Transmission Power Control ("TPC"), Transmission Reception Point ("TRP"), Transmission Time Interval ("TTI"), Transmit ("TX"), Uplink Control Information ("UCI"), User Entity/Equipment (Mobile Terminal) ("UE"), Uplink ("UL"), Universal Mobile Telecommunications System ("UMTS"), Uplink Pilot Time Slot ("UpPTS"), Ultra-reliability and Low-latency Communications ("URLLC"), and Worldwide Interoperability for Microwave Access ("WiMAX").

In certain wireless communications networks, paging occasions may be used. In such networks, resources for the paging occasions may be unknown.

BRIEF SUMMARY

Methods for determining paging occasion resources are disclosed. Apparatuses and systems also perform the functions of the apparatus. One embodiment of a method includes determining a first control resource set for receiving system information. In some embodiments, the method includes determining to use a second control resource set to determine a paging occasion. In such embodiments, the first control resource set is the same as the second control resource set in response to not receiving information indicating to use a different control resource set than the first control resource set.

One apparatus for determining paging occasion resources includes a processor that: determines a first control resource set for receiving system information; and determines to use a second control resource set to determine a paging occasion. In such embodiments, the first control resource set is the same as the second control resource set in response to not receiving information indicating to use a different control resource set than the first control resource set.

One method for determining paging occasion resources includes determining a first control resource set for transmitting system information. In some embodiments, the method includes determining to use a second control resource set to determine a paging occasion. In such embodiments, the first control resource set is the same as the second control resource set in response to not transmitting information indicating to use a different control resource set than the first control resource set.

One apparatus for determining paging occasion resources includes a processor that: determines a first control resource set for transmitting system information; and determines to use a second control resource set to determine a paging occasion. In such embodiments, the first control resource set is the same as the second control resource set in response to a transmitter of the apparatus not transmitting information indicating to use a different control resource set than the first control resource set.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
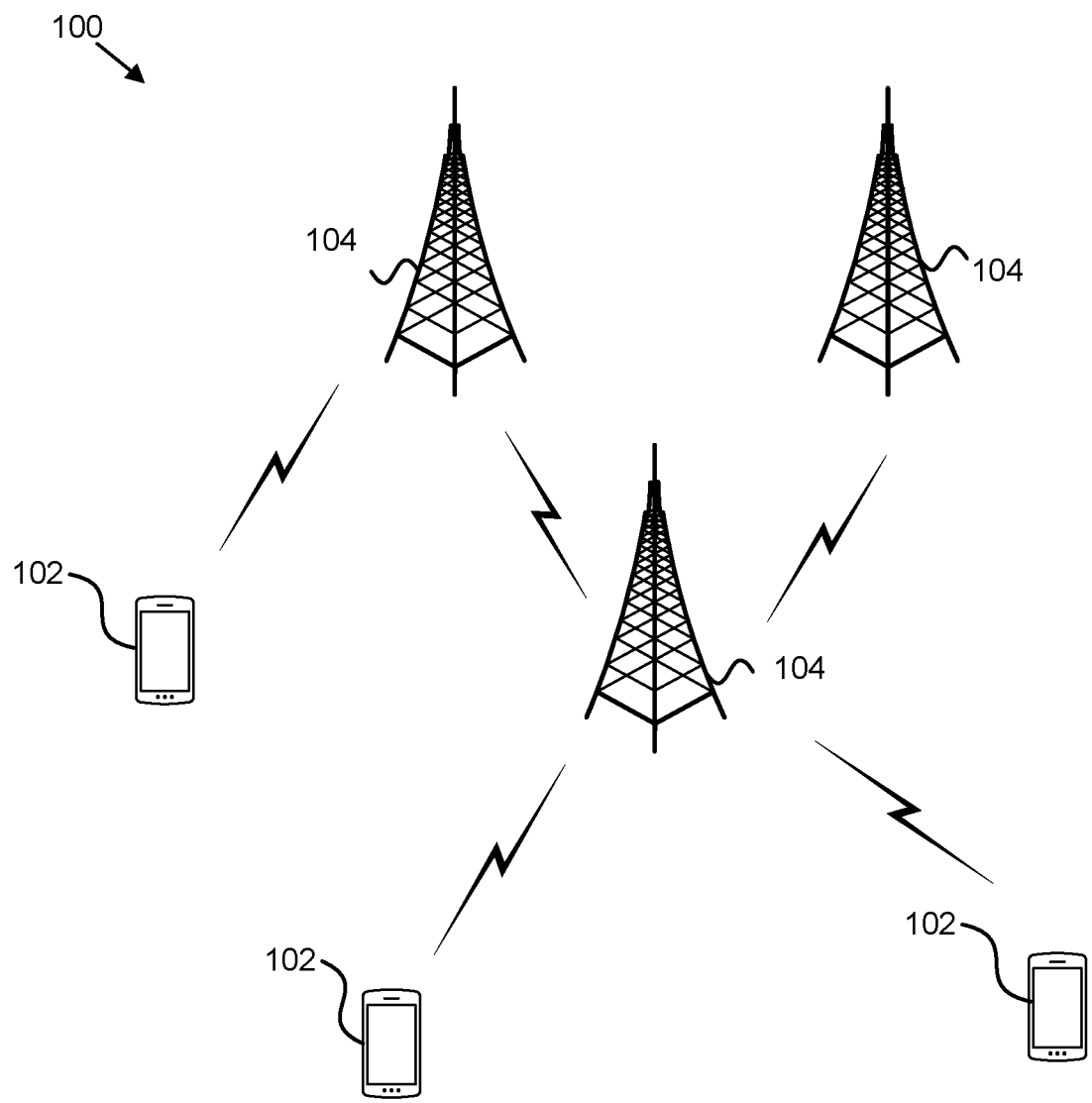
FIG. 1 is a schematic block diagram illustrating one embodiment of a wireless communication system for determining paging occasion resources.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for determining paging occasion resources. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a core network, an aerial server, a radio access node, an AP, NR, a network entity, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, IEEE 802.11 variants, GSM, GPRS, UMTS, LTE variants, CDMA2000, Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In one embodiment, a remote unit 102 may be used for determining paging occasion resources. In various embodiments, the remote unit 102 may determine a first control resource set for receiving system information. In some embodiments, the remote unit 102 may determine to use a second control resource set to determine a paging occasion. In such embodiments, the first control resource set is the same as the second control resource set in response to not receiving information indicating to use a different control resource set than the first control resource set. Accordingly, the remote unit 102 may be used for determining paging occasion resources.

In one embodiment, a network unit 104 may be used for determining paging occasion resources. In various embodiments, the network unit 104 may determine a first control resource set for transmitting system information. In some embodiments, the network unit 104 may determine to use a second control resource set to determine a paging occasion. In such embodiments, the first control resource set is the same as the second control resource set in response to not transmitting information indicating to use a different control resource set than the first control resource set. Accordingly, the network unit 104 may be used for determining paging occasion resources.

Figure 2:
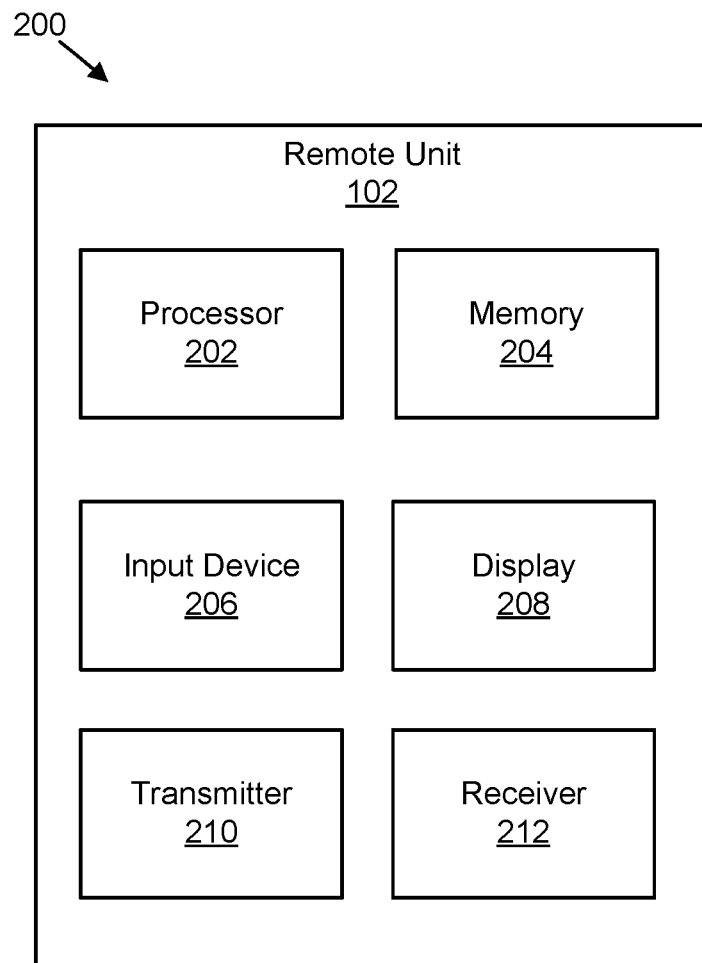
FIG. 2 is a schematic block diagram illustrating one embodiment of an apparatus that may be used for determining paging occasion resources.

FIG. 2 depicts one embodiment of an apparatus 200 that may be used for determining paging occasion resources. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In various embodiments, the processor 202 may: determine a first control resource set for receiving system information; and determine to use a second control resource set to determine a paging occasion. In such embodiments, the first control resource set is the same as the second control resource set in response to not receiving information indicating to use a different control resource set than the first control resource set. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104, as described herein. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
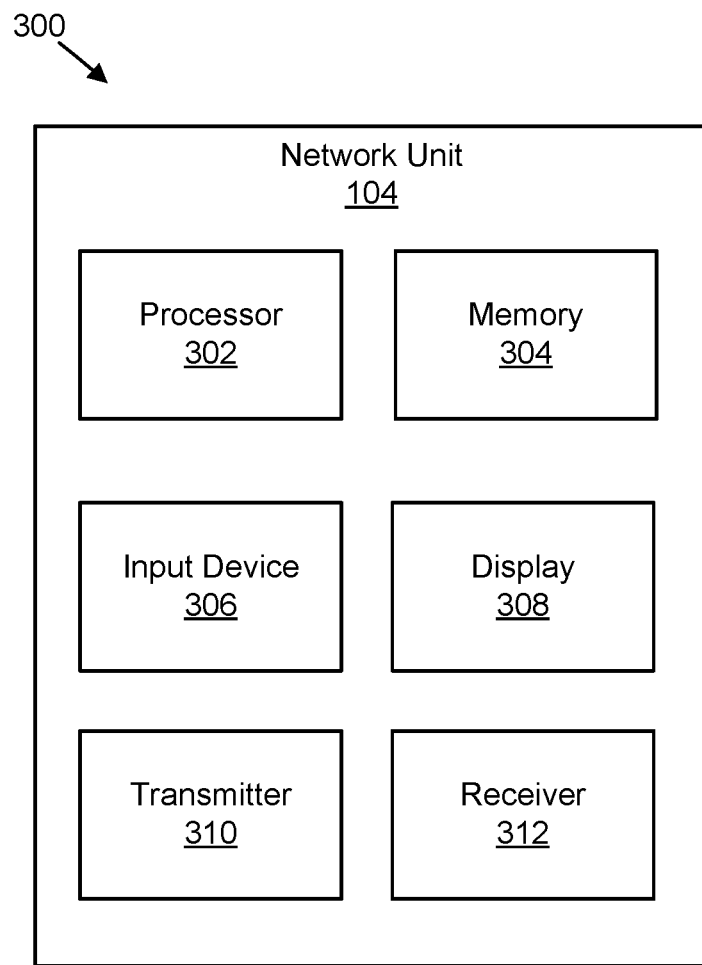
FIG. 3 is a schematic block diagram illustrating another embodiment of an apparatus that may be used for determining paging occasion resources.

FIG. 3 depicts another embodiment of an apparatus 300 that may be used for determining paging occasion resources. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the transmitter 310 may be used for transmitting configuration information of CORESETs and/or paging occasions. In some embodiments, the processor 302 may: determine a first control resource set for transmitting system information; and determine to use a second control resource set to determine a paging occasion. In such embodiments, the first control resource set is the same as the second control resource set in response to the transmitter 310 not transmitting information indicating to use a different control resource set than the first control resource set. Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In some embodiments, a paging procedure may be used by a network entity (e.g., gNB) to transmit paging information to a UE in idle mode, or to inform UEs of an SI change, an ETWS notification, a CMAS notification, an EAB parameter modification, or performing an inter-frequency redistribution procedure.

In various configurations, such as in a 5G new RAT supporting both single-beam and multi-beam operations, a single paging message may be transmitted one or multiple times with different TX beams of a gNB. This may be because in multi-beam based system operation each UE may receive at most a few gNB TX beams, and it may be difficult for the gNB to have up-to-date information about suitable TX beams for idle mode UEs. Furthermore, some messages such as SI change notifications and emergency warning notifications in a paging procedure may be delivered to all UEs in a cell.

In a single-beam based paging procedure, such as in LTE, one PO may be defined as a subframe (e.g., 1 millisecond) in which there may be a PDCCH that carries DCI to schedule a PDSCH carrying paging and/or notification information and may be scrambled by P-RNTI. Moreover, as used herein, one PF is one radio frame that may contain one or multiple POs.

In various embodiments, in a multi-beam based paging procedure, a gNB may generate multiple PDSCHs and/or PDCCHs on different TX beams for delivery using a single paging (or notification) message, and may multiplex the multiple paging PDSCHs and/or PDCCHs with other channels and signals. In some embodiments, a paging PDCCH beam sweep in a time domain may be supported separately from an SS-block.

In certain embodiments, methods to configure paging occasions may allow flexible allocation of radio resources for paging occasions with no signalling overhead or very limited signalling overhead in essential system information by reusing signalling for indication of CORESETs used for scheduling a PDSCH carrying RMSI (e.g., essential system information other than MIB). In various embodiments, allowing multi-subframe or multi-slot delay for transmitting a paging PDSCH with respect to transmission of paging DCI may enable efficient packing of beam sweep channels and may result in efficient resource utilization.

As used herein, an antenna port may be defined such that a channel over which a symbol on the antenna port is conveyed can be inferred from the channel over which another symbol on the same antenna port is conveyed.

Furthermore, two antenna ports are considered to be QCL if large-scale properties of a channel over which a symbol on one antenna port is conveyed can be inferred from the channel over which a symbol on the other antenna port is conveyed. Large-scale properties may include one or more of: delay spread, Doppler spread, Doppler shift, average gain, average delay, and/or spatial RX parameters. Moreover, two antenna ports may be QCL with respect to a subset of the large-scale properties. Spatial RX parameters may include one or more of: AoA, dominant AoA, average AoA, angular spread, PAS of AoA, average AoD, PAS of AoD, transmit channel correlation, receive channel correlation, transmit beamforming, receive beamforming, spatial channel correlation, and/or other parameters.

In some embodiments, a UE in an RRC_IDLE or an RRC_INACTIVE state may monitor paging with one paging occasion per DRX cycle. In such embodiments, the paging occasion may be a time interval over which a gNB transmits paging related channels and/or signals. In various embodiments, a length of a DRX cycle and a number of paging occasions in the DRX cycle may be configurable by a network entity (e.g., gNB, base station) and may be provided to a UE via a system information message. Additionally, in certain embodiments, a UE may be configured with a UE-specific DRX cycle length via dedicated signaling. If multiple paging occasions are configured in a DRX cycle, then UEs' paging may be distributed over the multiple paging occasions based on a UE ID. In some embodiments, paging occasion may include multiple time slots (e.g., OFDM symbols) to allow a network entity to transmit paging using a different downlink TX beam in each time slot or to repeat paging with the same TX beam for multiple time slots. In certain embodiments, the number of time slots for a paging occasion may be provided via system information. In one example, a paging message may include up to 16 UE IDs (e.g., S-TMSI—a temporary UE identity provided by a core network entity, an EPC that uniquely identifies the UE within a tracking area).

In various embodiments, a network entity may transmit one or more SS blocks (also referred to as SS/PBCH blocks) per period. In such embodiments, each SS block may be associated with one DL TX antenna port (or DL TX beam) and may carry PSS and/or SSS and additionally PBCH. In one example, an SS block may include four consecutive OFDM symbols with an order of PSS, PBCH, SSS, and PBCH symbols. In some embodiments, an SS burst set (or SS set) may include one or more SS blocks and may be transmitted periodically. In certain embodiments, a maximum number of SS blocks per SS burst set and time locations within an SS burst set period may be predefined per frequency band and may depend on an SCS of a synchronization signal. In some embodiments, time locations of actual transmitted SS blocks may be indicated to a UE to help a CONNECTED mode and/or IDLE mode UE perform measurement and receive DL data and/or control channels with proper rate matching around the transmitted SS blocks.

In one embodiment, a MIB in PBCH may include some essential minimum system information that is acquired by a UE to access a cell. In various embodiments, RMSI may be included in SystemInformationBlockType1 ("SIB1") and/or SystemInformationBlockType2 ("SIB2"). In some embodiments, SIB1 may use a fixed schedule (e.g., fixed radio frame number, slot number, and/or subframe number) with a predefined periodicity (e.g., 80 milliseconds) and repetitions may be made within the predefined periodicity. In some embodiments, a scheduling periodicity of SIB2 and/or other SIBs may be indicated in SIB1, and SIB2 may be transmitted within a periodically occurring time domain windows (e.g., referred to as SI-windows) using dynamic scheduling. In certain embodiments, a CORESET for a PDCCH scheduling a PDSCH carrying SIB1 and/or SIB2 may also periodically configured according to a scheduling periodicity of SIB1 and/or SIB2.

In some embodiments, such as in multi-beam based operations, each CORESET or each search space (e.g., possible PDCCH candidate positions within the CORESET) of the CORESET for PDCCHs carrying scheduling information of PDSCHs carrying the RMSI may be associated with one or more SS blocks. That is, a UE may employ the same RX beam to receive the CORESET (or the search space of the CORESET) and the associated one or more SS blocks and may assume QCL between the CORESET and the associated SS blocks in terms of propagation delay (e.g., average delay, delay spread), and/or Doppler parameters (Doppler spread and/or Doppler shift). Furthermore, PBCH in associated SS blocks may include an indication on a time and frequency resource for the CORESET for RMSI delivery.

In one embodiment, a paging occasion includes a set of CORESETs or a set of search spaces corresponding to a full gNB beam sweep, and a UE may determine at least one CORESET (or search space) of each of one or more sets of CORESETs (or search spaces) for one or more paging occasions based on the information on at least one CORESET of a set of CORESETs configured for the RMSI. In certain embodiments, a UE may determine at least one CORESET of the set of CORESETs configured for the RMSI delivery by decoding PBCH. In various embodiments, a UE may obtain information necessary to determine at least one CORESET (or search space) of each of one or more sets of CORESETs (or search spaces) for one or more paging occasions by decoding PDSCH carrying RMSI (e.g., SIB1 and/or SIB2). In certain embodiments, a monitoring periodicity of a paging DCI and/or PDCCH or paging search space may be different than (e.g., an integer multiple or sub-integer (1/k, k=integer) multiple of) a periodicity of the CORESET.

In some embodiments, a UE may receive an indication of one or more time and/or frequency offsets and/or distances from a set of CORESETs for an RMSI to the one or more sets of CORESETs for the one or more paging occasions in the RMSI, and may determine the at least one CORESET of each paging occasion by applying the indicated time and/or frequency offsets and/or distances to the at least one CORESET for the RMSI. In such embodiments, the time and/or frequency offsets and/or distances may be defined between two spatially QCL CORESETs, one for the RMSI and the other for the paging occasion (e.g., an antenna port of one CORESET for the RMSI is spatially QCL with an antenna port of one CORESET for paging). In various embodiments, a UE may apply a predetermined and/or known time and/or frequency offsets and/or distances to the at least one CORESET for the RMSI and accordingly determine the at least one CORESET of each paging occasion.

In certain embodiments, a UE may compute its own paging frame and paging occasion within the paging frame based on its UE ID and a DRX cycle length. In some embodiments, actual PDCCH transmissions for delivery of paging DCI may occur on a part of CORESETs or all the CORESETs for a given paging occasion, depending on network operation (e.g., turning off broadcast channels and/or signals temporarily for certain spatial directions due to very low UE activities). In various embodiments, a UE may monitor a couple of CORESETs associated with a couple of suitable gNB TX beams within its own paging occasion. In one embodiment, a CORESET for paging DCI is spatially QCL with a SS/PBCH block. In another embodiment, a CORESET for paging DCI and a CORESET for RMSI delivery are spatially QCL, and they are associated with antenna ports of two or more SS/PBCH blocks (e.g., joint transmission of two SS/PBCH block beams).

Figure 4:
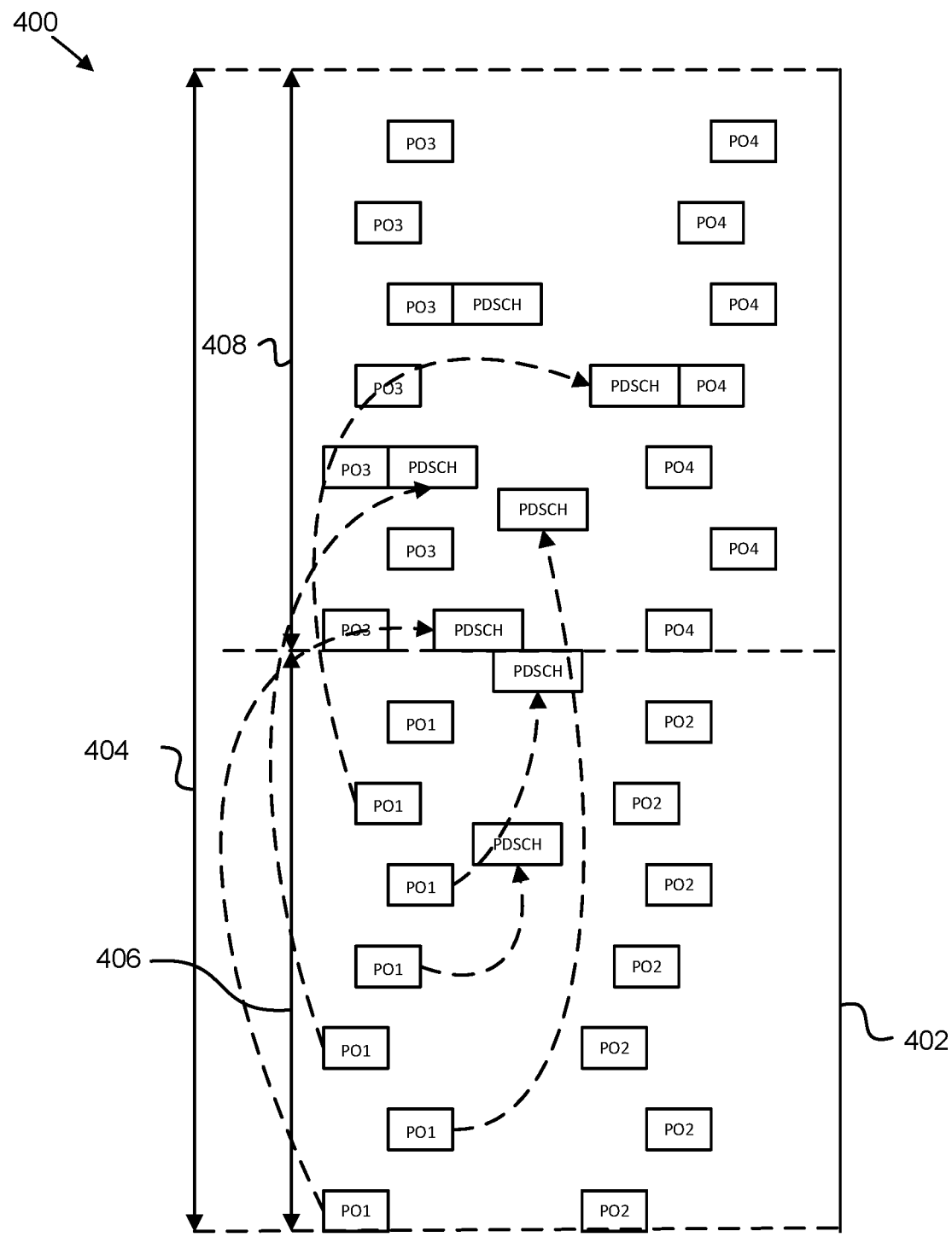
FIG. 4 is a schematic block diagram illustrating one embodiment of a timing diagram illustrating four paging occasions.

In various embodiments, a network entity may configure CORESETs for paging DCI the same as, as a super-set of, or as a sub-set of CORESETs for DCI scheduling RMSI messages. In one embodiment, a monitoring periodicity of the paging DCI/PDCCH or paging search space may be different than (e.g., an integer multiple or sub-integer (1/k, k=integer) multiple of) the periodicity of the CORESET. In some embodiments, a set of CORESETs for paging DCI (e.g., paging occasion) may need to be configured with a shorter periodicity than a set of CORESETs for DCI scheduling RMSI messages to accommodate paging capacity similar to LTE (e.g., 6400 paged UEs per second). In one embodiment, a set of CORESETs for paging DCI is configured in every radio frame and a set of CORESETs for RMSI delivery is configured in every other radio frame. In another embodiment, both CORESETs for paging DCI and CORESETs for RMSI delivery are configured in every other radio frame with the same radio frame offset, one set of CORESETs in a radio frame are shared for paging and RMSI delivery, and other sets of CORESETs in the radio frame are used for paging DCI, as shown in FIG. 4. FIG. 4 illustrates that the network entity configures 4 POs in a paging radio frame, wherein 2 POs are time and frequency multiplexed with SS/PBCH blocks. In addition, one PO is used for both paging and RMSI delivery. REs within CORESETs which are not used for PDCCH transmission can be used for transmission of other channels or signals, e.g. PDSCH via dynamic scheduling and indication.

FIG. 4 is a schematic block diagram illustrating one embodiment of a timing diagram 400 illustrating four paging occasions. A first paging occasion ("PO1"), a second paging occasion ("PO2"), a third paging occasion ("PO3"), and a fourth paging occasion ("PO4") are illustrated over a time period 402. The first paging occasion may include CORE-SETs for RMSI DCI and paging DCI, and the second paging occasion, third paging occasion, and fourth paging occasion may include CORESETs for paging DCI. Furthermore, PDSCH is illustrated that may carry a paging message for the first paging occasion. The time period 402 may include a paging frame 404 (e.g., paging radio frame). Moreover, the paging frame may be divided into a first half-frame 406 (e.g., 5 ms) and a second half-frame 408 (e.g., 5 ms). The arrows from the first paging occasions to the PDSCH indicate paging messages that may correspond to paging DCI in paging occasions.

In some embodiments, paging DCI can schedule a PDSCH carrying a paging message with one or multiple subframes or slots delay between a PDCCH carrying paging DCI and the PDSCH carrying the paging message. In various embodiments, flexible time and frequency resource allocation of PDSCH carrying the paging message could increase radio resource utilization efficiency by effectively multiplexing PDSCH carrying the paging message with other PDSCHs carrying user data or other paging occasions. In FIG. 4, it is shown that PDSCH which is transmitted with a first gNB TX beam and carries a paging message for the first paging occasion is frequency-domain multiplexed with one CORESET for the third paging occasion which is associated with the first gNB TX beam within the same OFDM symbols with 5 ms transmission delay. Since analog beamforming or analog-digital hybrid beamforming at gNB may limit flexible frequency-domain multiplexing of multiple channels and/or signals transmitted with different beams, multiplexing of a paging PDSCH with one CORE-SET of the corresponding paging occasion or other paging occasions within one or more OFDM symbols may be beneficial for efficient packing of beam sweep channels. In the embodiment of FIG. 4, as the first paging occasion and the second paging occasion are multiplexed with SS/PBCH blocks, less resource elements are available for transmission of paging PDSCH in the OFDM symbols which have CORESETs for the first paging occasion or the second paging occasion. In such an embodiment, multi-subframe or multi-slot transmission delay for paging PDSCH may allow a gNB to pack beam sweep channels efficiently. In some embodiments, to limit DCI signaling overhead a set of allowed subframe or slot-level delay values may be predefined or configured taking into account an allowed paging occasion configuration.

As may be appreciated, transmitting PDSCH carrying a paging message with multiple beams on the same time and frequency resource could reduce paging overhead. Thus, a UE may not assume spatial QCL between a CORESET for paging DCI and DM RS for the corresponding PDSCH carrying the paging message.

Figure 5:
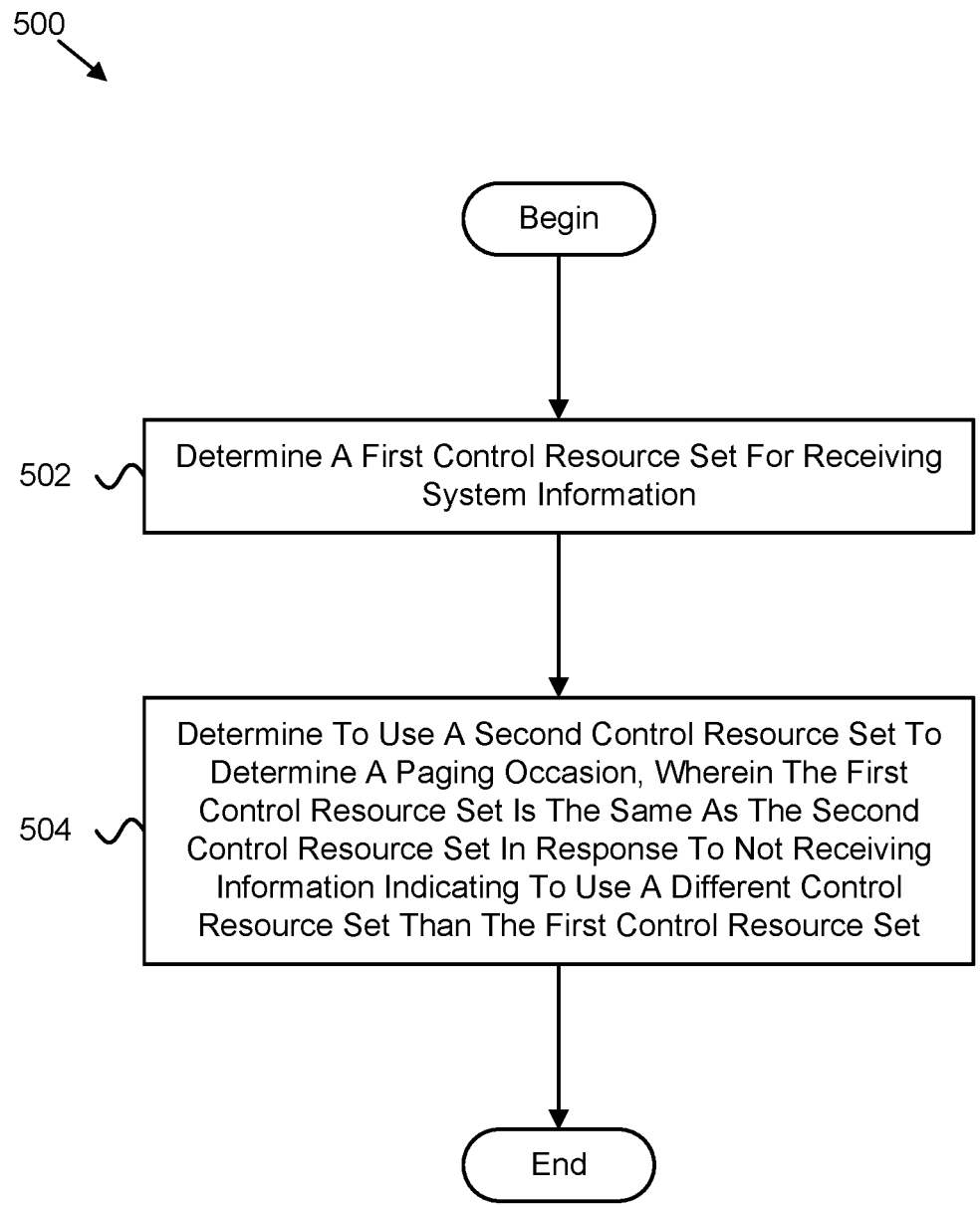
FIG. 5 is a flow chart diagram illustrating one embodiment of a method for determining paging occasion resources.

FIG. 5 is a flow chart diagram illustrating one embodiment of a method 500 for determining paging occasion resources. In some embodiments, the method 500 is performed by an apparatus, such as the remote unit 102. In certain embodiments, the method 500 may be performed by a processor executing program code, for example, a microcontroller, a microprocessor, a CPU, a GPU, an auxiliary processing unit, a FPGA, or the like.

The method 500 may include determining 502 a first control resource set for receiving system information. In some embodiments, the method 500 includes determining 504 to use a second control resource set to determine a paging occasion. In such embodiments, the first control resource set is the same as the second control resource set in response to not receiving information indicating to use a different control resource set than the first control resource set.

In certain embodiments, the method 500 comprises receiving information indicating to use the second control resource set. In some embodiments, determining to use the second control resource set to determine the paging occasion comprises determining to use the second control resource set in response to receiving the information indicating to use the second control resource set. In various embodiments, the second control resource set is based on the first control resource set.

In one embodiment, determining the first control resource set comprises decoding a physical broadcast channel to determine the first control resource set. In certain embodiments, the method 500 comprises determining the second control resource set by decoding a physical downlink shared channel carrying a system information block message. In some embodiments, the method 500 comprises determining the second control resource set by applying a time offset, a frequency offset, or a combination thereof to the first control resource set.

In various embodiments, the time offset, the frequency offset, or the combination thereof is received as a part of the system information. In one embodiment, the time offset, the frequency offset, or the combination thereof is predetermined. In certain embodiments, a first search space of the first control resource set and a second search space of the second control resource set are associated with at least one synchronization signal/physical broadcast channel block, and a user equipment uses a common receive beam to receive the first search space of the first control resource set, the second search space of the second control resource set, and the at least one associated synchronization signal/physical broadcast channel block.

In some embodiments, the first control resource set is used for a physical downlink control channel which includes scheduling information on a physical downlink shared channel carrying remaining minimum system information, and the remaining minimum system information comprises system information not included in a master information block of a physical broadcast channel. In various embodiments, the first control resource set and the second control resource set are spatially quasi-co-located in terms of delay spread, Doppler spread, Doppler shift, average gain, average delay, spatial receive parameters, or some combination thereof. In one embodiment, the second control resource set is a superset or a subset of the first control resource set.

In certain embodiments, the method comprises receiving a physical downlink shared channel scheduled by a physical downlink control channel in the second control resource set and a physical downlink control channel in a third control resource set on one or more common orthogonal frequency division multiplexed symbols, wherein the third control resource set is associated with another paging occasion. In some embodiments, the method comprises receiving a physical downlink control channel in the second control resource set which indicates a subframe or slot delay between the physical downlink control channel and a corresponding physical downlink shared channel.

In various embodiments, the paging occasion determined by the second control resource set comprises physical downlink control channel locations used to convey paging downlink control information. In one embodiment, a monitoring periodicity of the paging downlink control information is different from a periodicity of the second control resource set.

Figure 6:
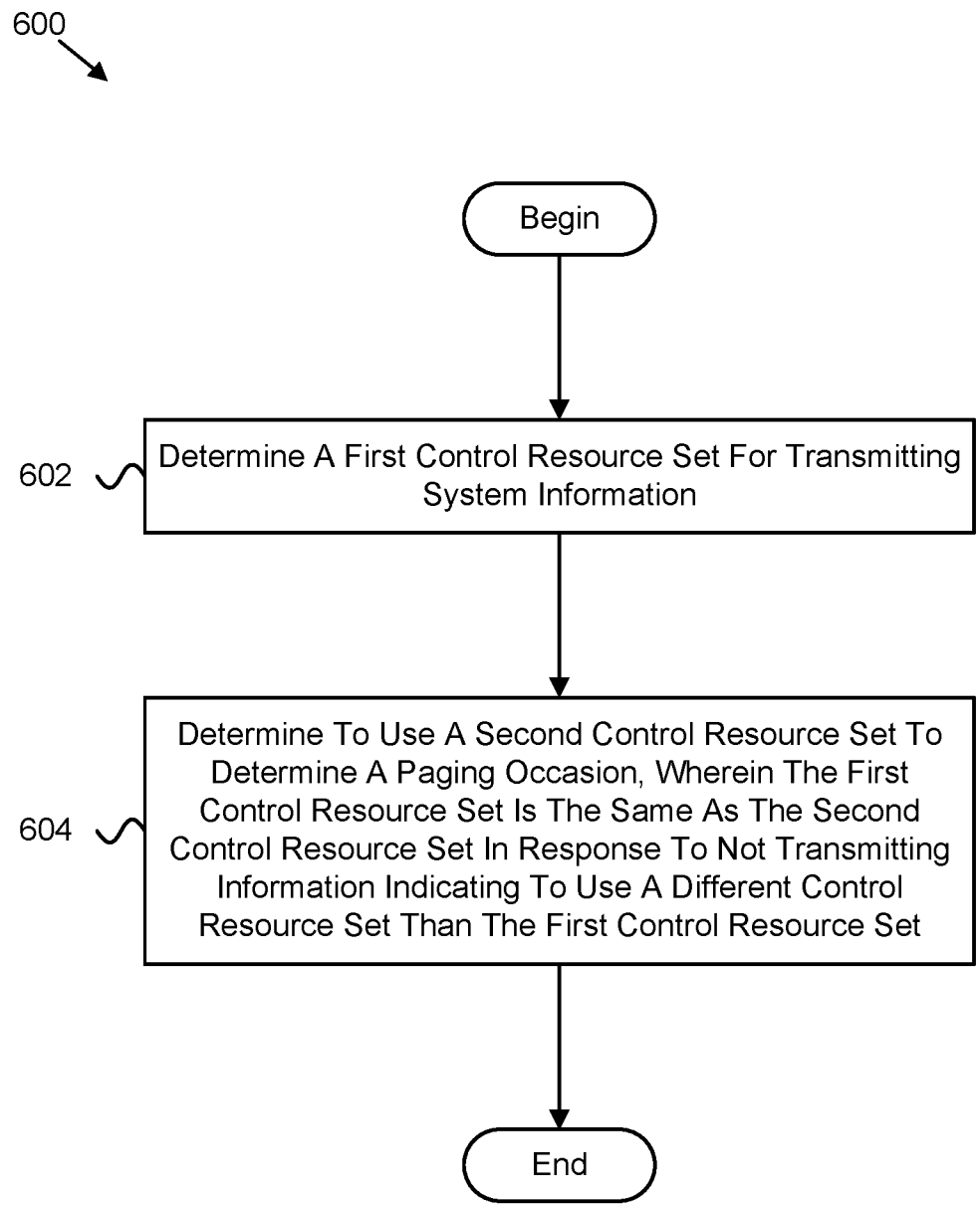
FIG. 6 is a flow chart diagram illustrating another embodiment of a method for determining paging occasion resources.

FIG. 6 is a flow chart diagram illustrating another embodiment of a method 600 for determining paging occasion resources. In some embodiments, the method 600 is performed by an apparatus, such as the network unit 104. In certain embodiments, the method 600 may be performed by a processor executing program code, for example, a microcontroller, a microprocessor, a CPU, a GPU, an auxiliary processing unit, a FPGA, or the like.

The method 600 may include determining 602 a first control resource set for transmitting system information. In some embodiments, the method 600 includes determining 604 to use a second control resource set to determine a paging occasion. In such embodiments, the first control resource set is the same as the second control resource set in response to not transmitting information indicating to use a different control resource set than the first control resource set.

In certain embodiments, the method 600 comprises transmitting information indicating to use the second control resource set. In some embodiments, determining to use the second control resource set to determine the paging occasion comprises determining to use the second control resource set in response to transmitting the information indicating to use the second control resource. In various embodiments, the second control resource set is based on the first control resource set. In some embodiments, the method 600 comprises transmitting a physical broadcast channel comprising an indication of the first control resource set.

In one embodiment, the method 600 comprises transmitting a physical downlink shared channel carrying a system information block message used to determine the second control resource set. In certain embodiments, the second control resource set is determined by applying a time offset, a frequency offset, or a combination thereof to the first control resource set. In some embodiments, the time offset, the frequency offset, or the combination thereof is transmitted as a part of the system information.

In various embodiments, the time offset, the frequency offset, or the combination thereof is predetermined. In one embodiment, a first search space of the first control resource set and a second search space of the second control resource set are associated with at least one synchronization signal/physical broadcast channel block, and a user equipment uses a common receive beam to receive the first search space of the first control resource set, the second search space of the second control resource set, and the at least one associated synchronization signal/physical broadcast channel block. In certain embodiments, the first control resource set is used for a physical downlink control channel which includes scheduling information on a physical downlink shared channel carrying remaining minimum system information, and the remaining minimum system information comprises system information not included in a master information block of a physical broadcast channel.

In some embodiments, the first control resource set and the second control resource set are spatially quasi-co-located in terms of delay spread, Doppler spread, Doppler shift, average gain, average delay, spatial receive parameters, or some combination thereof. In various embodiments, the second control resource set is a superset or a subset of the first control resource set. In one embodiment, the method 600 comprises transmitting a physical downlink shared channel scheduled by a physical downlink control channel in the second control resource set and a physical downlink control channel in a third control resource set on one or more common orthogonal frequency division multiplexed symbols, wherein the third control resource set is associated with another paging occasion.

In certain embodiments, the method comprises 600 transmitting a physical downlink control channel in the second control resource set which indicates a subframe or slot delay between the physical downlink control channel and a corresponding physical downlink shared channel. In some embodiments, the paging occasion determined by the second control resource set comprises physical downlink control channel locations used to convey paging downlink control information. In various embodiments, a monitoring periodicity of the paging downlink control information is different from a periodicity of the second control resource set.

In one embodiment, a method comprises: determining a first control resource set for receiving system information; and determining to use a second control resource set to determine a paging occasion, wherein the first control resource set is the same as the second control resource set in response to not receiving information indicating to use a different control resource set than the first control resource set.

In certain embodiments, the method comprises receiving information indicating to use the second control resource set.

In some embodiments, determining to use the second control resource set to determine the paging occasion comprises determining to use the second control resource set in response to receiving the information indicating to use the second control resource set.

In various embodiments, the second control resource set is based on the first control resource set.

In one embodiment, determining the first control resource set comprises decoding a physical broadcast channel to determine the first control resource set.

In certain embodiments, the method comprises determining the second control resource set by decoding a physical downlink shared channel carrying a system information block message.

In some embodiments, the method comprises determining the second control resource set by applying a time offset, a frequency offset, or a combination thereof to the first control resource set.

In various embodiments, the time offset, the frequency offset, or the combination thereof is received as a part of the system information.

In one embodiment, the time offset, the frequency offset, or the combination thereof is predetermined.

In certain embodiments, a first search space of the first control resource set and a second search space of the second control resource set are associated with at least one synchronization signal/physical broadcast channel block, and a user equipment uses a common receive beam to receive the first search space of the first control resource set, the second search space of the second control resource set, and the at least one associated synchronization signal/physical broadcast channel block.

In some embodiments, the first control resource set is used for a physical downlink control channel which includes scheduling information on a physical downlink shared channel carrying remaining minimum system information, and the remaining minimum system information comprises system information not included in a master information block of a physical broadcast channel.

In various embodiments, the first control resource set and the second control resource set are spatially quasi-co-located in terms of delay spread, Doppler spread, Doppler shift, average gain, average delay, spatial receive parameters, or some combination thereof.

In one embodiment, the second control resource set is a superset or a subset of the first control resource set.

In certain embodiments, the method comprises receiving a physical downlink shared channel scheduled by a physical downlink control channel in the second control resource set and a physical downlink control channel in a third control resource set on one or more common orthogonal frequency division multiplexed symbols, wherein the third control resource set is associated with another paging occasion.

In some embodiments, the method comprises receiving a physical downlink control channel in the second control resource set which indicates a subframe or slot delay between the physical downlink control channel and a corresponding physical downlink shared channel.

In various embodiments, the paging occasion determined by the second control resource set comprises physical downlink control channel locations used to convey paging downlink control information.

In one embodiment, a monitoring periodicity of the paging downlink control information is different from a periodicity of the second control resource set.

In one embodiment, an apparatus comprises: a processor that: determines a first control resource set for receiving system information; and determines to use a second control resource set to determine a paging occasion, wherein the first control resource set is the same as the second control resource set in response to not receiving information indicating to use a different control resource set than the first control resource set.

In certain embodiments, the apparatus comprises a receiver that receives information indicating to use the second control resource set.

In some embodiments, the processor determines to use the second control resource set to determine the paging occasion by determining to use the second control resource set in response to receiving the information indicating to use the second control resource set.

In various embodiments, the second control resource set is based on the first control resource set.

In one embodiment, the processor determines the first control resource set by decoding a physical broadcast channel to determine the first control resource set.

In certain embodiments, the processor determines the second control resource set by decoding a physical downlink shared channel carrying a system information block message.

In some embodiments, the processor determines the second control resource set by applying a time offset, a frequency offset, or a combination thereof to the first control resource set.

In various embodiments, the time offset, the frequency offset, or the combination thereof is received as a part of the system information.

In one embodiment, the time offset, the frequency offset, or the combination thereof is predetermined.

In certain embodiments, a first search space of the first control resource set and a second search space of the second control resource set are associated with at least one synchronization signal/physical broadcast channel block, and a receiver of the apparatus uses a common receive beam to receive the first search space of the first control resource set, the second search space of the second control resource set, and the at least one associated synchronization signal/physical broadcast channel block.

In some embodiments, the first control resource set is used for a physical downlink control channel which includes scheduling information on a physical downlink shared channel carrying remaining minimum system information, and the remaining minimum system information comprises system information not included in a master information block of a physical broadcast channel.

In various embodiments, the first control resource set and the second control resource set are spatially quasi-co-located in terms of delay spread, Doppler spread, Doppler shift, average gain, average delay, spatial receive parameters, or some combination thereof.

In one embodiment, the second control resource set is a superset or a subset of the first control resource set.

In certain embodiments, the apparatus comprises a receiver that receives a physical downlink shared channel scheduled by a physical downlink control channel in the second control resource set and a physical downlink control channel in a third control resource set on one or more common orthogonal frequency division multiplexed symbols, wherein the third control resource set is associated with another paging occasion.

In some embodiments, the apparatus comprises a receiver that receives a physical downlink control channel in the second control resource set which indicates a subframe or slot delay between the physical downlink control channel and a corresponding physical downlink shared channel.

In various embodiments, the paging occasion determined by the second control resource set comprises physical downlink control channel locations used to convey paging downlink control information.

In one embodiment, a monitoring periodicity of the paging downlink control information is different from a periodicity of the second control resource set.

In one embodiment, a method comprises: determining a first control resource set for transmitting system information; and determining to use a second control resource set to determine a paging occasion, wherein the first control resource set is the same as the second control resource set in response to not transmitting information indicating to use a different control resource set than the first control resource set.

In certain embodiments, the method comprises transmitting information indicating to use the second control resource set.

In some embodiments, determining to use the second control resource set to determine the paging occasion comprises determining to use the second control resource set in response to transmitting the information indicating to use the second control resource set.

In various embodiments, the second control resource set is based on the first control resource set.

In some embodiments, the method comprises transmitting a physical broadcast channel comprising an indication of the first control resource set.

In one embodiment, the method comprises transmitting a physical downlink shared channel carrying a system information block message used to determine the second control resource set.

In certain embodiments, the second control resource set is determined by applying a time offset, a frequency offset, or a combination thereof to the first control resource set.

In some embodiments, the time offset, the frequency offset, or the combination thereof is transmitted as a part of the system information.

In various embodiments, the time offset, the frequency offset, or the combination thereof is predetermined.

In one embodiment, a first search space of the first control resource set and a second search space of the second control resource set are associated with at least one synchronization signal/physical broadcast channel block, and a user equipment uses a common receive beam to receive the first search space of the first control resource set, the second search space of the second control resource set, and the at least one associated synchronization signal/physical broadcast channel block.

In certain embodiments, the first control resource set is used for a physical downlink control channel which includes scheduling information on a physical downlink shared channel carrying remaining minimum system information, and the remaining minimum system information comprises system information not included in a master information block of a physical broadcast channel.

In some embodiments, the first control resource set and the second control resource set are spatially quasi-co-located in terms of delay spread, Doppler spread, Doppler shift, average gain, average delay, spatial receive parameters, or some combination thereof.

In various embodiments, the second control resource set is a superset or a subset of the first control resource set.

In one embodiment, the method comprises transmitting a physical downlink shared channel scheduled by a physical downlink control channel in the second control resource set and a physical downlink control channel in a third control resource set on one or more common orthogonal frequency division multiplexed symbols, wherein the third control resource set is associated with another paging occasion.

In certain embodiments, the method comprises transmitting a physical downlink control channel in the second control resource set which indicates a subframe or slot delay between the physical downlink control channel and a corresponding physical downlink shared channel.

In some embodiments, the paging occasion determined by the second control resource set comprises physical downlink control channel locations used to convey paging downlink control information.

In various embodiments, a monitoring periodicity of the paging downlink control information is different from a periodicity of the second control resource set.

In one embodiment, an apparatus comprises: a processor that: determines a first control resource set for transmitting system information; and determines to use a second control resource set to determine a paging occasion, wherein the first control resource set is the same as the second control resource set in response to a transmitter of the apparatus not transmitting information indicating to use a different control resource set than the first control resource set.

In certain embodiments, the apparatus comprises the transmitter, wherein the transmitter transmits information indicating to use the second control resource set.

In some embodiments, the processor determines to use the second control resource set to determine the paging occasion by determining to use the second control resource set in response to the transmitter transmitting the information indicating to use the second control resource set.

In various embodiments, the second control resource set is based on the first control resource set.

In some embodiments, the apparatus comprises the transmitter, wherein the transmitter transmits a physical broadcast channel comprising an indication of the first control resource set.

In one embodiment, the apparatus comprises the transmitter, wherein the transmitter transmits a physical downlink shared channel carrying a system information block message used to determine the second control resource set.

In certain embodiments, the second control resource set is determined by applying a time offset, a frequency offset, or a combination thereof to the first control resource set.

In some embodiments, the time offset, the frequency offset, or the combination thereof is transmitted as a part of the system information.

In various embodiments, the time offset, the frequency offset, or the combination thereof is predetermined.

In one embodiment, a first search space of the first control resource set and a second search space of the second control resource set are associated with at least one synchronization signal/physical broadcast channel block, and a user equipment uses a common receive beam to receive the first search space of the first control resource set, the second search space of the second control resource set, and the at least one associated synchronization signal/physical broadcast channel block.

In certain embodiments, the first control resource set is used for a physical downlink control channel which includes scheduling information on a physical downlink shared channel carrying remaining minimum system information, and the remaining minimum system information comprises system information not included in a master information block of a physical broadcast channel.

In some embodiments, the first control resource set and the second control resource set are spatially quasi-co-located in terms of delay spread, Doppler spread, Doppler shift, average gain, average delay, spatial receive parameters, or some combination thereof.

In various embodiments, the second control resource set is a superset or a subset of the first control resource set.

In one embodiment, the apparatus comprises the transmitter, wherein the transmitter transmits a physical downlink shared channel scheduled by a physical downlink control channel in the second control resource set and a physical downlink control channel in a third control resource set on one or more common orthogonal frequency division multiplexed symbols, wherein the third control resource set is associated with another paging occasion.

In certain embodiments, the apparatus comprises the transmitter, wherein the transmitter transmits a physical downlink control channel in the second control resource set which indicates a subframe or slot delay between the physical downlink control channel and a corresponding physical downlink shared channel.

In some embodiments, the paging occasion determined by the second control resource set comprises physical downlink control channel locations used to convey paging downlink control information.

In various embodiments, a monitoring periodicity of the paging downlink control information is different from a periodicity of the second control resource set.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
receiving information indicating a first control resource set for receiving system information, wherein the first control resource set is configured by a network unit; and
determining to use a second control resource set to determine a paging occasion, wherein the first control resource set is the same as the second control resource set in response to not receiving, within a determined time interval associated with a paging occasion, information indicating to use a different control resource set than the first control resource set; and
determining that a physical downlink control channel received in the first control resource set, a physical downlink control channel received in the second control resource set, and the at least one associated synchronization signal/physical broadcast channel block are quasi-co-located if the first control resource set is the same as the second control resource set, and if the first control resource set and the second control resource set are associated with the at least one synchronization signal/physical broadcast channel block.

2. The method of claim 1, wherein determining to use the second control resource set to determine the paging occasion comprises determining to use the second control resource set in response to receiving information indicating to use the second control resource set.

3. The method of claim 2, wherein the second control resource set is based on the first control resource set.

4. The method of claim 1, further comprising determining the second control resource set by decoding a physical downlink shared channel carrying a system information block message.

5. The method of claim 1, further comprising determining the second control resource set by applying a time offset, a frequency offset, or a combination thereof to the first control resource set.

6. The method of claim 5, wherein the time offset, the frequency offset, or the combination thereof is received as a part of the system information.

7. The method of claim 5, wherein the time offset, the frequency offset, or the combination thereof is predetermined.

8. The method of claim 1, wherein determining the quasi-co-location comprises using a common receive beam to receive the physical downlink control channel in the first control resource set, the physical downlink control channel in the second control resource set, and the at least one associated synchronization signal/physical broadcast channel block.

9. The method of claim 1, wherein the first control resource set and the second control resource set are spatially quasi-co-located in terms of delay spread, Doppler spread, Doppler shift, average gain, average delay, spatial receive parameters, or some combination thereof.

10. The method of claim 1, wherein the second control resource set is a superset or a subset of the first control resource set.

11. The method of claim 1, further comprising receiving a physical downlink shared channel scheduled by a physical downlink control channel in the second control resource set and a physical downlink control channel in a third control resource set on one or more common orthogonal frequency division multiplexed symbols, wherein the third control resource set is associated with another paging occasion.

12. The method of claim 1, further comprising receiving a physical downlink control channel in the second control resource set which indicates a subframe or slot delay between the physical downlink control channel and a corresponding physical downlink shared channel.

13. The method of claim 1, wherein the paging occasion determined by the second control resource set comprises physical downlink control channel locations used to convey paging downlink control information.

14. The method of claim 13, wherein a monitoring periodicity of the paging downlink control information is different from a periodicity of the second control resource set.

15. An apparatus comprising:
a processor that:
receives information indicating a first control resource set for receiving system information, wherein the first control resource set is configured by a network unit; and
determines to use a second control resource set to determine a paging occasion, wherein the first control resource set is the same as the second control resource set in response to the second control resource set not being configured by the network unit, wherein the first control resource set is the same as the second control resource set in response to not receiving, within a determined time interval associated with a paging occasion, information indicating to use a different control resource set than the first control resource set; and
determine that a physical downlink control channel received in the first control resource set, a physical downlink control channel received in the second control resource set, and the at least one associated synchronization signal/physical broadcast channel block are quasi-co-located if the first control resource set is the same as the second control resource set, and if the first control resource set and the second control resource set are associated with the at least one synchronization signal/physical broadcast channel block.

16. The apparatus of claim 15, wherein the processor determines the second control resource set by decoding a physical downlink shared channel carrying a system information block message.

17. The apparatus of claim 15, wherein determining the quasi-co-location comprises using a common receive beam to receive the physical downlink control channel in the first control resource set, the physical downlink control channel in the second control resource set, and the at least one associated synchronization signal/physical broadcast channel block.

18. The apparatus of claim 15, wherein the second control resource set is a superset or a subset of the first control resource set.

19. The apparatus of claim 15, wherein the paging occasion determined by the second control resource set comprises physical downlink control channel locations used to convey paging downlink control information.

20. The apparatus of claim 19, wherein a monitoring periodicity of the paging downlink control information is different from a periodicity of the second control resource set.

* * * * *